Oct. 15, 1929.  R. WEDEBERG  1,731,803
NIPPLE
Filed April 11, 1927

Inventor:
Reuben Wedeberg,
By: Williams, Bradbury,
McCalet + Hinkle
Atty's.

Patented Oct. 15, 1929

1,731,803

UNITED STATES PATENT OFFICE

REUBEN WEDEBERG, OF CHICAGO, ILLINOIS, ASSIGNOR TO ALEMITE CORPORATION, OF CHICAGO, ILLINOIS, A CORPORATION OF DELAWARE

NIPPLE

Application filed April 11, 1927. Serial No. 182,552.

My invention relates to nipples and is more particularly concerned with lubricant receiving nipples adapted to form part of a high pressure lubricating system, such as that disclosed in Patents Nos. 1,307,733 and 1,307,734 to Arthur V. Gullborg. Lubricating systems of this type comprise a plurality of nipples or fittings adapted to be secured to the bearings of a machine to be lubricated, and a lubricant compressor for supplying lubricant at high pressure and provided with a discharge conduit terminating in a nozzle or coupling member which may be readily attached to and detached from the lubricant receiving nipples in succession. The preferred form of interlocking means for attaching the coupling member to the lubricant receiving nipples comprises the well known bayonet lock and it is to nipples provided with this type of coupling means that my invention relates.

Lubricant receiving nipples of the type to which my invention relates, are manufactured in great numbers, and to facilitate the making thereof by automatic, high speed machinery while at the same time providing a construction having maximum strength, it is usual to form the body of the nipple from relatively soft material, such as brass, and to form the interlocking means of a single steel pin extending through said body and projecting from both sides thereof for interengagement with a slotted part of a coupling member. These nipples are further provided with a valved inlet, the valve being maintained on its seat by a small coil spring confined between the valve and the pin. I have found it desirable to eliminate the valve at the inlet end of the nipple and substitute therefor a small self-sealing inlet opening which performs the same function. I furthermore provide, at the discharge end of the nipple, a check valve of a type which has not heretofore been used in lubricant receiving nipples.

An object of my invention is to provide a new and improved nipple.

Another object is to provide a nipple of the type described having a small self-sealing inlet opening.

Another object is to provide a nipple having a valve at the discharge end thereof.

Another object is to provide a construction of nipple which eliminates the coil spring heretofore used.

Another object is to provide a nipple having sealing means at both ends thereof.

Further objects and advantages will appear as the description proceeds.

Figure 1:
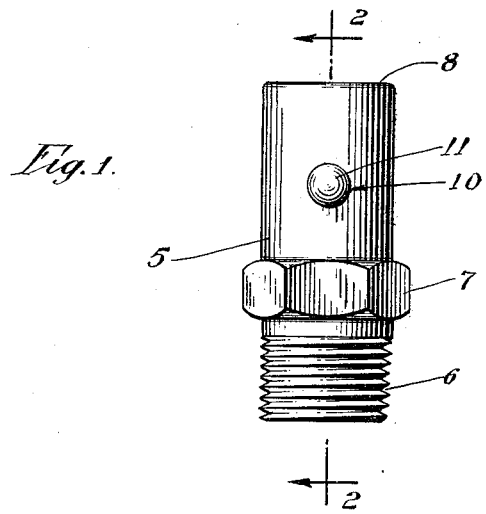
Figure 1 is a side elevation of my new and improved nipple.
Figure 2:
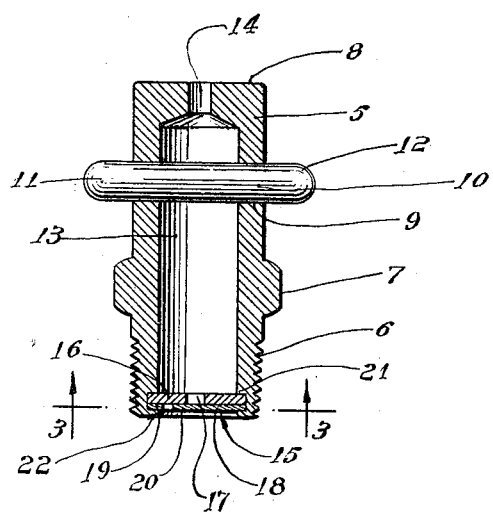
Figure 2 is a section on the line 2—2 of Figure 1.
Figure 3:
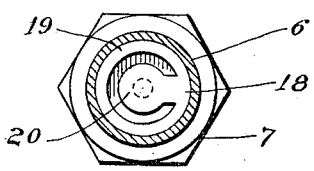
Figure 3 is a view on line 3—3 of Figure 2.

Referring to the drawing, my nipple has a body 5, preferably made of brass or other comparatively soft material, and having a threaded discharge end 6 adapted to be secured to a part to be lubricated. Adjacent the threaded end 6 is a non-circular part 7, preferably hexagonal in cross section, and designed to co-operate with a wrench used in securing the nipple to a part to be lubricated. The body 5 is further provided with a substantially flat inlet end 8 for effecting a lubricant tight seal with the coupling part of a lubricant compressor and the body is also bored transversely, as at 9, to receive a coupling pin 10 held in place by friction. The pin 10 has projecting ends 11 and 12 for interlocking with a slotted end of the coupling and said pin is preferably made of steel or other strong material to resist the high stresses imposed thereon.

The body 5 of the nipple has a bore 13 of comparatively large diameter extending from the discharge end to a point adjacent the inlet end. The bore 13 is in communication with a small inlet bore 14 of such diameter as to be self-sealing when grease is used as a lubricating medium. This self-sealing inlet serves substantially the same purpose as the valve heretofore used.

At the discharge end of the nipple I provide a check valve 15 which is opened by the lubricant injected into the nipple and permits such lubricant to pass to the bearing to be lubricated. This check valve comprises a washer 16 having a small central opening 17 therethrough and a spring valve member 18, preferably of bronze, and including a ring-shaped part 19 and a tongue 20 adapted to lie over the opening 17 in the washer 16. The washer 16 and valve member 18 are held in position by a shoulder 21 and a turned in part 22 of the body 5.

In using my new and improved nipple, the coupling member on the end of the discharge conduit of a lubricant compressor is first securely attached to the nipple and thereafter lubricant is injected therein. The lubricant passes through the small inlet 14, through the bore 13 and opening 17, pushing aside the tongue 20 and passing into the bearing to be lubricated. After sufficient lubricant has been supplied to the bearing, the supply of lubricant is cut off and the coupling member detached from the nipple. This relieves the pressure on the lubricant in the bore 13 and permits the tongue 20 to return to its normal position, closing the opening 17 in the washer 16. Where the lubricant used is grease of the type usually used for lubricating the bearings of machinery, the viscosity of the lubricant is such as to prevent any back flow of lubricant through the small opening 14 at the inlet end of the nipple, except where the grease supplied to the nipple contains air entrapped therein, under which conditions the expansion of the air trapped in the body of the nipple will effect a slight extrusion of grease outwardly through the inlet opening 14 and this extruded grease will form a small dust cap on the end of the nipple which may be readily wiped off at the next lubricating operation.

Having thus illustrated and described a preferred embodiment of my invention, what I claim and desire to secure by United States Letters Patent is:

1. A lubricant receiving nipple comprising a tubular body having an end adapted to be secured to a part to be lubricated and a second substantially flat end provided with an inlet opening, said inlet opening being of such size as to be self-sealing, a washer having a small central opening secured in said body adjacent the first named end thereof, and a spring valve in contact with said washer, said valve including a tongue adapted to overlie the opening in said washer.

2. A lubricant receiving nipple comprising an axially bored body, a flat end provided with a self-sealing inlet opening of small diameter and a second end provided with means for attaching said body to a part to be lubricated, a nut-like part intermediate said ends, a single pin extending through said body and projecting from both sides thereof, and a valve adjacent said other end, said valve comprising a washer having a small central opening and a co-operating part having a resilient tongue normally closing said opening.

3. In lubricating apparatus of the class described, a lubricant receiving nipple comprising a tubular body having an inlet provided with a short self-sealing inlet passageway of small diameter, said body having a discharge end and a passageway of large cross section connecting said inlet passageway with said discharge end, a cross pin having ends projecting from each side of said body, said pin extending transversely of said large passageway, an annular washer defining the outlet end of said large passageway, said washer providing a valve seat, and a movable valve normally resting against said valve seat and in sealed engagement therewith.

4. In lubricating apparatus of the class described, a lubricant receiving nipple comprising a body adapted to be secured to a part to be lubricated, said body having a passage including a restricted part and a valve for said passage, said valve comprising a washer and a spring tongue adapted to close the restricted part of the passage.

In witness whereof, I hereunto subscribe my name this 6th day of April, 1927.

REUBEN WEDEBERG.